United States Patent [19]

Catala

[11] 4,361,826
[45] Nov. 30, 1982

[54] CLUTCH ALARM SYSTEM

[76] Inventor: Restituto P. Catala, 4648 Broadway, New York, N.Y. 10040

[21] Appl. No.: 200,252

[22] Filed: Oct. 23, 1980

[51] Int. Cl.³ .......................................... G08B 19/00
[52] U.S. Cl. ................................ 340/52 F; 200/61.89
[58] Field of Search ............... 340/52 R, 52 D, 52 F; 200/61.44, 61.58 R, 61.69, 61.89

[56] References Cited
U.S. PATENT DOCUMENTS
3,375,496 3/1968 Antunovic ............................ 340/66
3,821,700 6/1974 Russell .............................. 340/52 F Primary Examiner—Alvin H. Waring
Attorney, Agent, or Firm—Auslander, Thomas & Morrison

[57] ABSTRACT

Normally-open switches in series with a power source to an alarm device are closed by simultaneous actuation of a motor vehicle clutch and accelerator to provide an alarm to the operator. Means are provided for preventing the generation of an alarm during low-gear start-up and/or during synchronized operation of the controls for gear changing.

12 Claims, 7 Drawing Figures

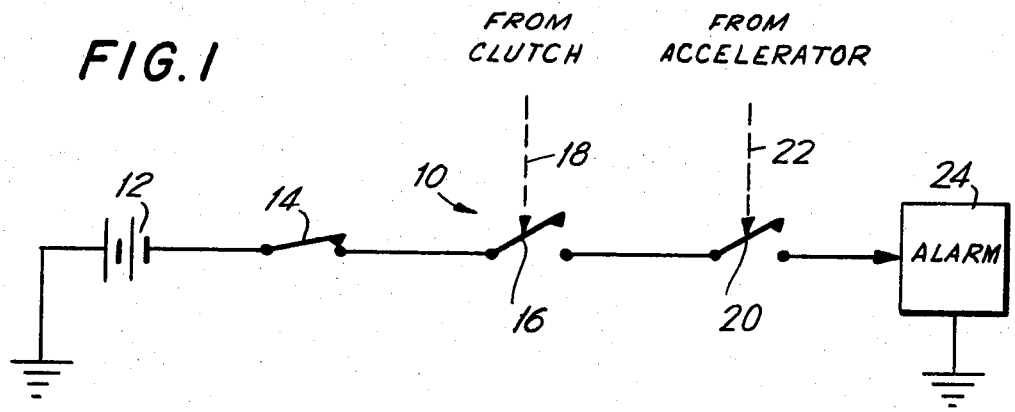
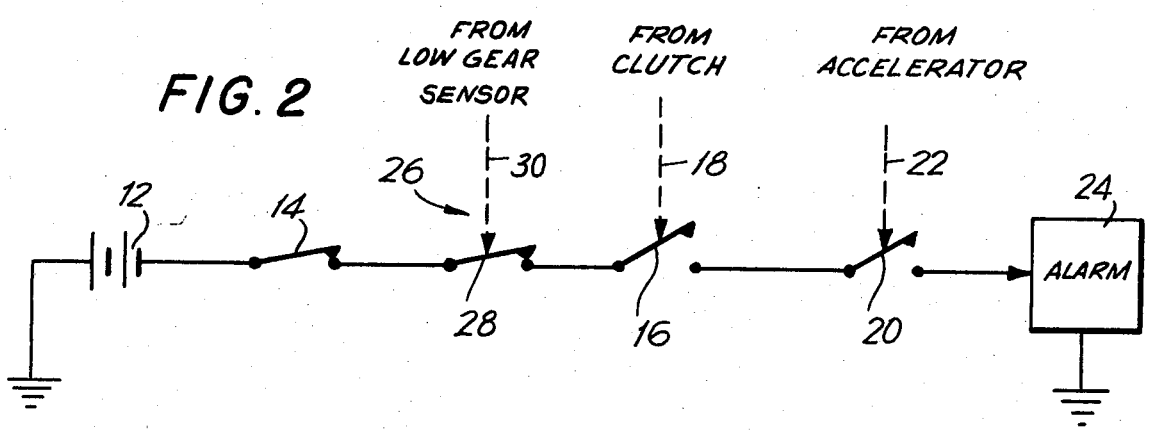
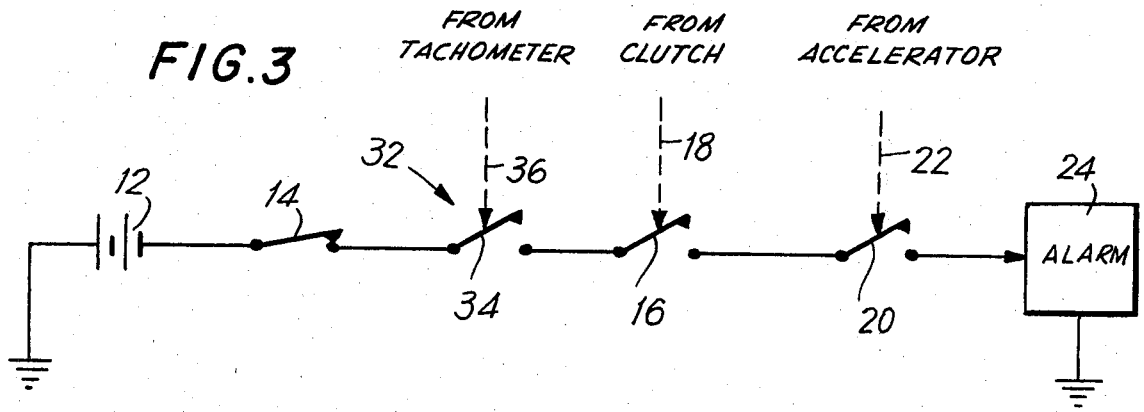

CLUTCH ALARM SYSTEM

BACKGROUND OF THE INVENTION

This invention relates to motor vehicle alarm systems and, more particularly, to an alarm system for warning the motor vehicle operator of a slipping clutch condition due to improper operation of clutch and accelerator.

In standard shift motor vehicles, if the clutch pedal is slightly depressed during normal driving, it is possible to slightly disengage the clutch so that excessive wear can occur. Some vehicle operators have the habit of lightly resting a foot on the clutch pedal and are not aware of the excessive wear which is occurring.

The situation is especially severe in heavy trucks since the cost of replacing a clutch therein may be several thousand dollars.

OBJECTS AND SUMMARY OF THE INVENTION

Accordingly, it is an object of the present invention to provide an apparatus for alerting a vehicle operator of a slipping or high wear condition in a vehicle clutch.

It is a further object of the invention to provide an apparatus which alerts the operator to the fact that a clutch and accelerator are operated at the same time.

It is a further object of the invention to provide an apparatus for alerting the operator of a motor vehicle to the simultaneous actuation of clutch and accelerator but to provide a means for suppressing the alarm when starting up in low gear.

It is a further object of the invention to provide an apparatus for avoiding the generation of an alarm during synchronized operation of clutch and accelerator in gear changing.

Accordingly, it is a feature of the present invention to provide an alarm system for a motor vehicle of the type having a manually operated clutch and a manually operated accelerator comprising an alarm device operative when energized to produce an alarm, and means responsive to simultaneous operation of the clutch and accelerator for energizing the alarm device.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a schematic and block diagram of a clutch alarm system according to an embodiment of the invention;

FIG. 2 is a schematic diagram of a clutch alarm system according to a second embodiment of the invention in which a low gear sensor prevents the production of an alarm during starting of the vehicle;

FIG. 3 is a schematic diagram of a clutch alarm system in which a tachometer sensor prevents generation of an alarm signal during low engine RPM;

DETAILED DESCRIPTION OF THE PREFERRED EMBODIMENTS

Figure 4:
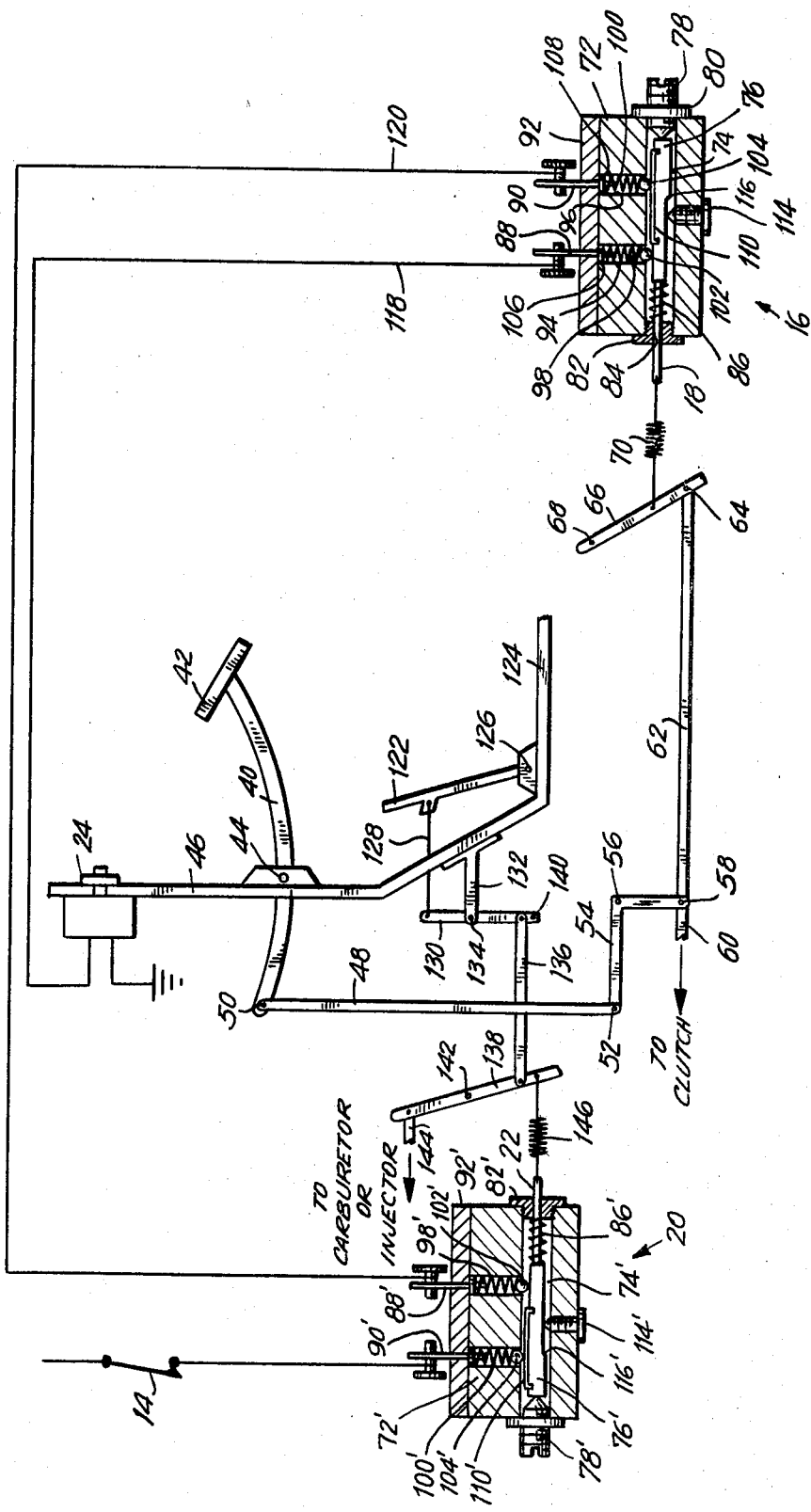
FIG. 4 is a schematic diagram of a clutch alarm system according to a further embodiment of the invention.

Referring now to FIG. 1, there is shown, generally at 10, a clutch alarm system according to an embodiment of the present invention which is effective to provide an alarm when the clutch and accelerator are simultaneously actuated. DC power from a vehicle battery 12 is connected through an ignition switch 14 to one terminal of a normally-open switch 16. Normally-open switch 16 is closed suitably by a mechanical input as indicated by a dashed line 18 when a vehicle clutch (not shown in FIG. 1) is actuated to a predetermined extent.

Normally-open switch 16 is, in turn, connected in series with a normally-open switch 20 which may be actuated by a mechanical input indicated by a dashed line 22 from an accelerator control. Normally-open switch 20 is connected to an alarm device 24 which may be an audible and/or visible alarm to alert the operator to the fact that both the clutch and accelerator are actuated at the same time and may be producing clutch wear.

Although the circuit in FIG. 1 is effective to alert the vehicle operator to the simultaneous actuation of the clutch and accelerator, it has the drawback that, when initially starting the vehicle from a stop, the simultaneous actuation of the clutch and accelerator which is necessary to get the vehicle moving always produces an alarm. This can be distracting and/or annoying to the vehicle operator.

One means for avoiding alarms during startup is shown in FIG. 2 wherein a clutch alarm system, shown generally at 26 includes a low-gear interlock switch 28 which is mechanically actuated, as indicated by a dashed line 30, by a linkage which senses engagement of the low gear in the vehicle. Low-gear interlock switch 28 is closed at all times except when the low gear is engaged. Closing of normally-open switches 16 and 20 by simultaneous actuation of the clutch and the accelerator in all gears except low gear, energizes alarm 24 through the closed contacts of low gear interlock switch 28. However, when the low gear is engaged, low-gear interlock switch 28 interrupts power so that simultaneous closing of normally-open switches 16 and 20 during start-up do not produce an alarm signal in alarm device 24.

In the embodiment of FIG. 2, actuation of alarm device 24 can be avoided when switching from gear to gear by fully releasing the accelerator and thus opening normally-open switch 20 before disengaging the clutch and closing normally-open switch 16 and then fully engaging the clutch to again open normally-open switch 16 before pressing the accelerator to close switch normally-open switch 20. Such fully alternate operation of accelerator and clutch does not represent good synchronization of these controls. It is preferable to disengage the clutch as the accelerator is in the process of being released and to depress the accelerator slightly in advance of engagement of the clutch. Thus the embodiment of FIG. 2, although avoiding an alarm in low gear operation, may still produce two short alarms during gear change, that is, while the clutch is being disengaged and again when it is being engaged if conventional synchronization of these controls is performed. These short alarm periods may be overcome by employing a delay (not shown) in alarm device 24 which permits alarm device 24 to ignore short alarm signals having a duration of, for example, less than from 0.25 to about 1.0 seconds.

A further approach to avoiding alarms during gear change is shown in a clutch alarm system of FIG. 3. Diesel-driven vehicles normally operate over a very narrow range of engine speeds such as, for example, from about 1,000 to about 1,500 revolutions per minute. As the vehicle speed and engine RPM change with grade etc., the vehicle operator picks up or drops a gear in order to continue to maintain the engine RPM within the operating range. During start-up in low gear, this is not the case. From a dead stop and until the vehicle is in motion, the engine speed remains below the normal operating range. Furthermore, the engine speed should still be well below the normal operating range during start-up by the time the clutch is fully engaged.

A normally open tachometer interlock switch 34 is in series between ignition switch 14 and normally-open switch 16. Tachometer interlock switch 34 is mechanically actuated by a mechanical input indicated by a dashed line 36 for closure thereof above a predetermined engine speed. For example, tachometer interlock switch 34 may be closed at all engine speeds in excess of 500 RPM and be opened at lower engine speeds. Thus, during start-up, and until the engine speed exceeds 500 RPM, tachometer interlock switch 34 prevents production of an alarm signal by alarm device 24 even though normally-opened switches 16 and 20 are closed by simultaneous operation of the clutch and the accelerator. Above 500 RPM, the closed contacts of tachometer interlock switch 34 permit the production of an alarm. Tachometer interlock switch 34 is preferably a vacuum switch actuated by vacuum in a diesel engine intake manifold.

During gear change with properly synchronized operation of the clutch and accelerator, the engine speed before the clutch becomes disengaged is in the operating range of, for example, from about 1,000 to about 1,500 RPM. Thus, if the clutch is disengaged while the accelerator is still partially depressed, switches 16 and 20 are closed while tachometer interlock switch 34 is also closed. This will produce a clutch alarm during disengagement of the clutch. During engagement of the clutch following gear change, the same spurious alarm signal may be generated. Thus, the embodiment of FIG. 3 has the same characteristics as the embodiment of FIG. 2. That is, although this embodiment avoids spurious alarms during start-up from a dead stop, it does not avoid spurious alarms during gear change with properly synchronized operation of clutch and accelerator.

The clutch alarm system shown generally in FIG. 4 overcomes all of the drawbacks of the above-described embodiments. Electrically, this clutch alarm system is substantially the same as clutch alarms system 10 in FIG. 1.

A clutch pedal rod 40 having a clutch pedal 42 at one end thereof is pivoted on a pivot 44 in a firewall 46 of a vehicle. A linkage rod 48 is pivotally connected at a pivot 50 to the second end of clutch pedal rod 40 the other end of linkage rod 48 is pivotally connected at a pivot 52 to an L-shaped linkage 54. L-shaped linkage 54 is pivoted to the vehicle at a pivot 56. The second end of L-shaped linkage 54 is pivotally connected by a pivot 58 to a clutch push rod 60 which is connected to the clutch (not shown).

A switch push rod 62, which may also be pivoted on pivot 58, is connected by a pivot 64 to a switch control lever 66 which is, in turn, pivoted to the vehicle by a pivot 68. A resilient element such as, for example, a coil spring 70, is connected from an intermediate point on switch control lever 66 to an end of a sliding linkage 18 which corresponds to the mechanical dashed line input 18 of FIG. 1.

Switch 16 includes a housing 72, preferably of non-conducting material such as plastic, having a longitudinal cavity 74 therein. A sliding block 76 is disposed in longitudinal cavity 74 and is connected to sliding linkage 18. Sliding block 76 is preferably of non-conducting material such as plastic. An adjusting screw 78 and a jam nut 80 limit the rightward motion of sliding block 76.

A linkage guide nut 82 threadedly engaged in the end of longitudinal cavity 74 includes a guide hole 84 therein for guiding sliding linkage 18. A resilient member such as, for example, a coil spring 86 is biased between the inner end of linkage guide nut 82 and sliding block 76 to urge sliding block 76 rightward in FIG. 4 against adjusting screw 78.

First and second electrical terminals 88 and 90 enter housing 72 through a top cover 92 thereof and protrude partially into corresponding spaced apart parallel holes 94 and 96 in housing 72. Resilient members such as, for example, coil springs 98 and 100 in holes 94 and 96 respectively, urge contact balls 102 and 104 respectively into engagement with an upper surface of sliding block 76. Electrical connection is obtained between spring 98 and electrical terminal 88 through a conductive disc 106 on electrical terminal 88 against which the upper end of coil spring 98 is pressed. Similarly, a conductive disc 108 provides electrical contact between coil spring 100 and electrical terminal 90. Coil springs 98 and 100, being in contact with metallic contact balls 102 and 104 provide electrical continuity between electrical terminal 88 and contact ball 102 and between electrical terminal 90 and contact ball 104 respectively.

A metallic bridge contact 110 overlays a portion of the top surface of sliding block 76. In the unactuated condition of clutch pedal rod 40, bridge contact 110 is out of contact with contact ball 102 and therefore does not provide electrical continuity between electrical terminals 88 and 90.

A stop screw 114 is threaded through the bottom of housing 72 and protrudes part way into longitudinal cavity 74. An abutment surface 116 on the bottom of sliding block 76 limits the leftward travel of sliding block 76 as will be explained. A lead 118 is connected from electrical terminal 88 to alarm device 24. A second lead 120 is connected to a terminal 88′ of normally-open switch 20.

Normally-open switch 20 is identical to normally-open switch 16 except for certain minor differences noted hereinafter. Elements of normally-open switch 20 are identified with prime numerals corresponding to the reference numerals identifying corresponding parts of normally-open switch 16. The principal difference between normally-open switch 20 and normally-open switch 16 is that normally-open switch 20 requires a much longer travel of sliding block 76′ before bridge contact 110′ is brought into contact with contact ball 102′ whereas this contact is made almost immediately upon any motion of sliding block 76 in normally-open switch 16.

A conventional accelerator pedal 122 is pivoted to a floorboard 124 by a pivot 126. An accelerator pedal push rod 128 is pivotably connected at a first end to accelerator pedal 122 and, after passing through firewall 46, is pivotably connected to one end of a link 130. A support 132, affixed to the rear of firewall 46, pivotably supports link 130 at a pivot 134. A second end of link 130 is connected through a linkage rod 136 to a link 138. As is conventional, one or more additional connection points, such as spare connection hole 140 may be provided for connecting linkage rod 136 to link 130 in order to change the mechanical advantage of the accelerator linkage.

Link 138 is pivoted to the vehicle by a pivot 142 and the upper end thereof is connected through a carborator or injector push rod 144 to a carborator or injector (not shown) of the vehicle.

A second end of link 138 is connected through a resilient member such as, for example, a coil spring 146 to sliding linkage 22 which corresponds to the dashed-line mechanical coupling 22 from the accelrator shown in FIG. 1. Electrical terminal 90' is connected through ignition switch 14 to the battery (not shown in FIG. 4).

Conduction through normally-open switch 16 can only take place when bridge contact 110 is simultaneously in contact with contact balls 102 and 104. In the condition shown in FIG. 4 with clutch pedal 42 in its fully released condition, and sliding block 76 in its fully rightward position against adjusting screw 78, although contact ball 104 rests on bridge contact 110, contact ball 102 is out of contact with bridge contact 110 and therefore an open circuit exists between electrical terminals 88 and 90. Similarly, with accelerator pedal 122 in its fully released position and sliding block 76' to the left resting against adjusting screw 78', bridge contact 110' is out of contact with contact ball 102' and an open circuit exists between electrical terminals 88' and 90'. Thus, the electrical circuit between ignition switch 14 and alarm device 24 is broken in two places and alarm device 24 remains deenergized.

Figure 5:
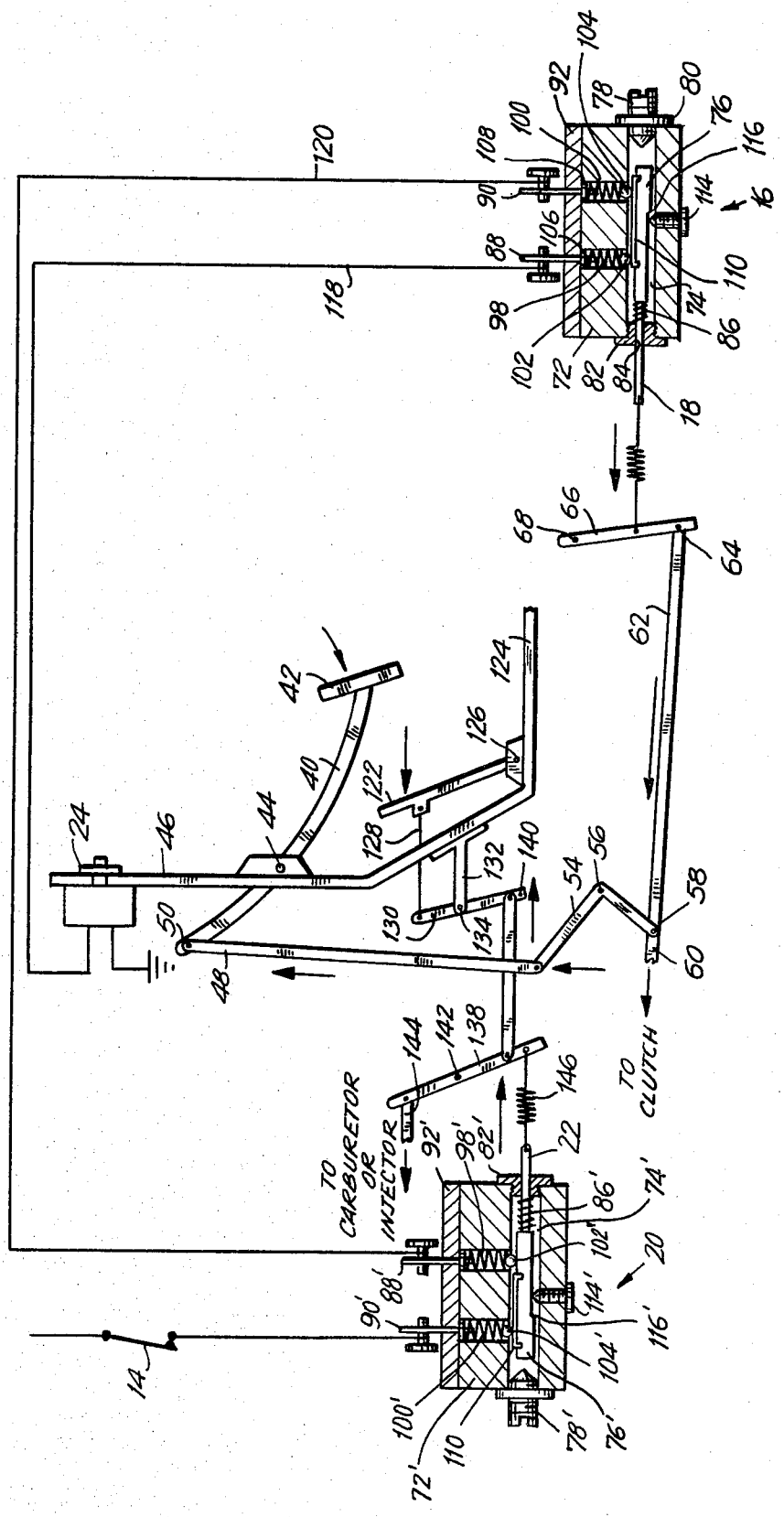
FIG. 5 is a schematic diagram corresponding to FIG. 4 wherein a clutch and accelerator pedal are slightly depressed.

Referring now to FIG. 5, a condition is shown which is typical of low-gear starting and synchronized gear change. That is, accelerator pedal 122 is partly depressed to produce a relatively low engine RPM such as, for example, less than 500 RPM and clutch pedal 42 is also partially depressed. By virtue of the fact that bridge contact 110 in normally-open switch 16 is relatively close to contact ball 102 in its deenergized condition, even relatively slight depressing of clutch pedal 42 is sufficient to move bridge contact 110 into contact with contact ball 102 and to close the electrical circuit between electrical terminals 88 and 90 of normally-open switch 16. The same is not true in normally-open switch 20 wherein bridge contact 110' is considerably further away from contact ball 102' in its rest position. Therefore, in the partially depressed condition of accelerator pedal 122, bridge contact 110' is still not in contact with contact ball 102' and therefore an open circuit exists between electrical terminals 88' and 90'.

Since an open circuit exists between ignition switch 14 and alarm device 24, alarm device 24 remains deenergized under this condition. Thus, in a normal low-gear operation and during normal synchronized gear shifting, alarm device 24 remains deenergized.

Figure 6:
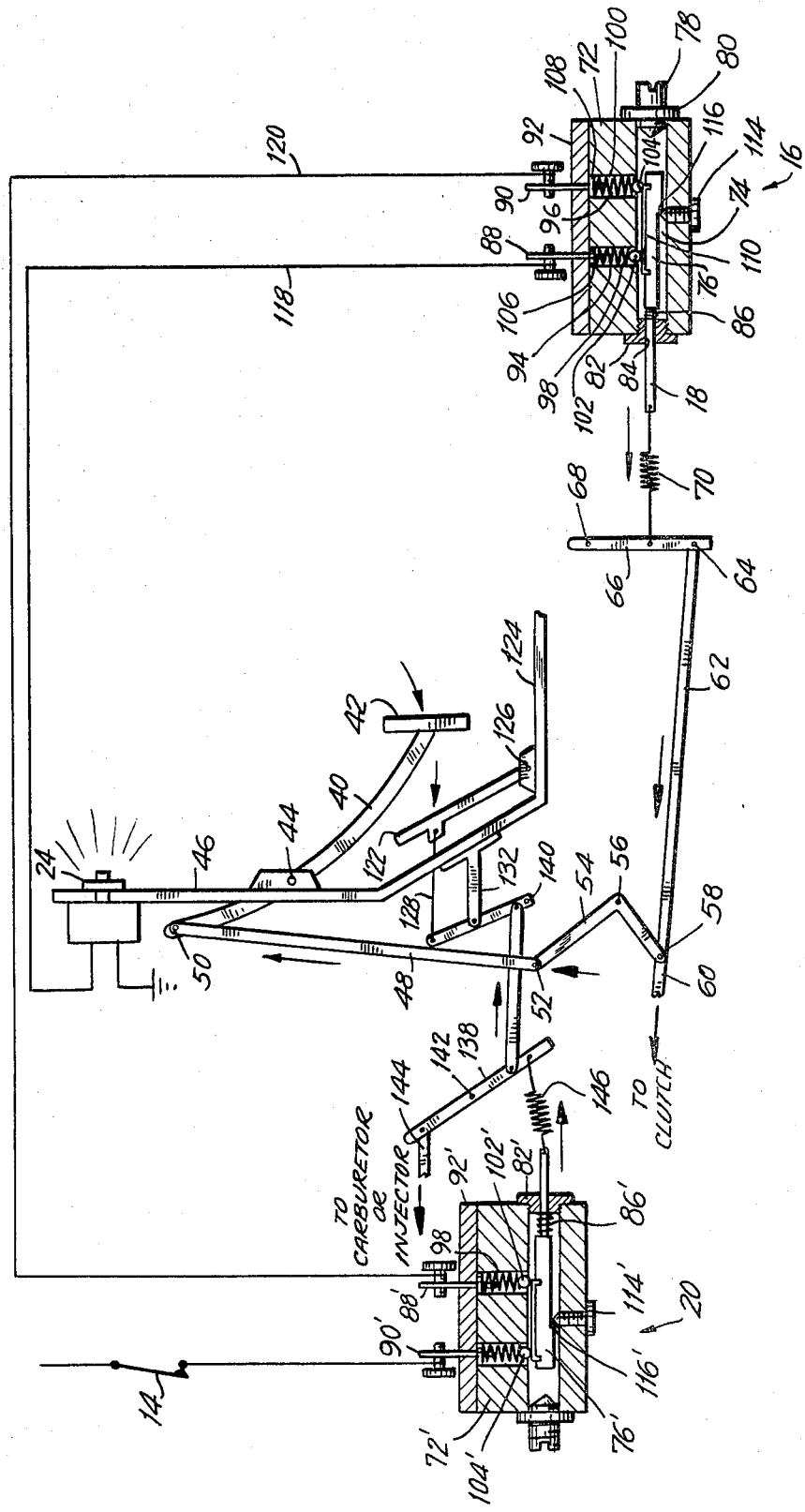
FIG. 6 is a schematic diagram corresponding to FIG. 4 wherein the clutch and accelerator pedals are more fully depressed to generate an alarm signal.

Referring now to FIG. 6, the condition is shown in which clutch pedal 42 is more depressed than the condition shown in FIG. 5 and accelerator pedal 122 is depressed to a position which would be normal for maintaining engine speed in the normal driving range. Sliding block 76 has been drawn far enough leftward to move abutment surface 116 into contact with stop screw 114. Any additional motion of clutch pedal 42 beyond that which is required to move sliding block 76 into the position shown is taken up by expansion of coil spring 70. Bridge contact 110 is in simultaneous contact with contact balls 102 and 104 to provide a closed circuit between electrical terminals 88 and 90.

In the more fully depressed condition of accelerator pedal 122, sliding block 76' of normally-open switch 20 is drawn far enough to the right to place bridge contact 110' in simultaneous contact with contact balls 102' and 104'. Abutment surface 116' contacts stop screw 114' to prevent further rightward movement of sliding block 76'. Coil spring 146 takes up any additional motion of accelerator pedal 122. In the fully rightward position shown, bridge contact 110', being simultaneously in contact with contact balls 102' and 104', provides a closed circuit between electrical terminals 88' and 90'. Thus, a complete electrical circuit is provided from ignition switch 14, through normally-open switch 20 and normally-open switch 16 to alarm device 24. Under this condition, alarm device 24 is activated. Alarm device 24 remains activated until accelerator pedal 122 is partly released to a condition similar to that shown in FIG. 5 or until clutch pedal 42 is almost fully released.

A result similar to that achieved with the apparatus shown in FIGS. 4, 5 and 6 may be accomplished using a clutch alarm system such as shown at 10 in FIG. 1 except, instead of using a mechanical input 22 from an accelerator to actuate a normally-open switch 20, mechanical input 22 could be derived from a manifold pressure sensor which would close normally-open switch 20 when the intake manifold pressure exceeded a predetermined value. Thus, while the manifold pressure is low, as is characteristic of small depression of an accelerator pedal in a carburetted gasoline engine, normally-open switch 20 remains in the open condition shown, whereas, when manifold pressure is high, as is characteristic of a more fully depressed accelerator, normally-open switch 20 is closed so that, if normally-open switch 16 is closed by a mechanical input 18 from the clutch linkage, alarm device 24 is actuated.

Figure 7:
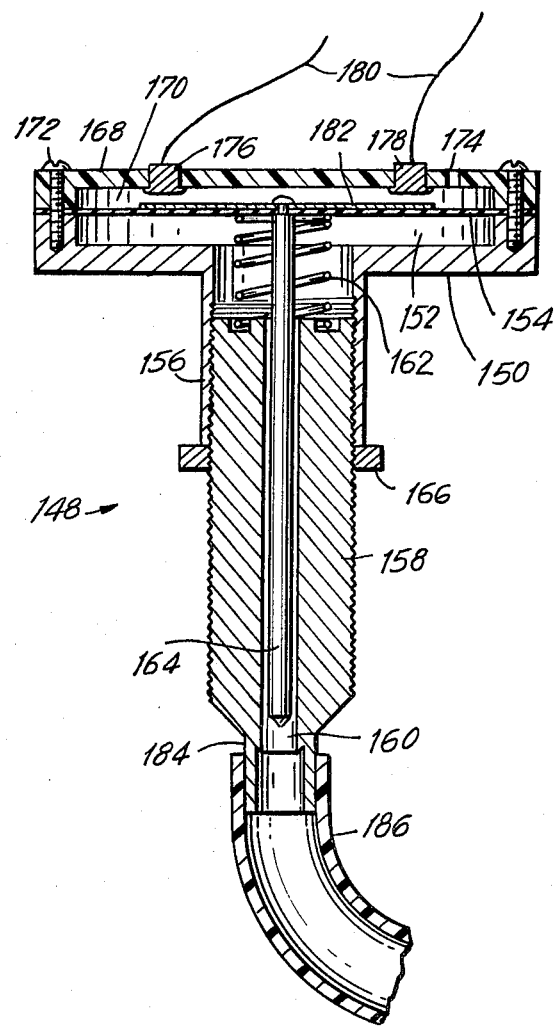
FIG. 7 is a cross section of a vacuum-operated switch adapted for use in the embodiments of the invention shown in FIGS. 1–3.

Referring now to FIG. 7, there is shown a vacuum-operated switch 148 which, when connected to a source of intake manifold pressure in a carburetted gasoline engine, remains open at small values of depression of an accelerator pedal (not shown) and is closed at larger values of depression of the accelerator pedal. A switch lower body 150 defines a cup shaped lower chamber 152. The top of lower chamber 152 is closed by a resilient membrane or diaphragm 154. A tubular extension 156, which is conveniently internally threaded, extends axially from lower body 150.

An externally threaded adjuster 158 having an axial channel 160 therethrough is threaded into tubular extension 156 and contacts one end of a spring 162. The other end of spring 162 contacts the underside of diaphragm 154. A guide rod 164 may optionally be provided having one end centrally affixed to diaphragm 154 and the other end loosely disposed in axial channel 160. A jam nut 166 locks adjuster 158 in any selected position.

A cover 168 fits over diaphragm 154 in opposition to lower body 150 to define an upper chamber 170. Cover 168 is secured in position by any convenient means such as, for example, by a plurality of screws 172. An atmospheric port 174 provides open communication between upper chamber 170 and the exterior of switch 148. Thus, upper chamber 170 is always maintained at a pressure substantially equal to air pressure.

Cover 168 is preferably of insulating material, and most preferably of molded plastic insulating material. First and second metallic contacts 176 and 178 pass through cover 168. A pair of wires 180, connected to metallic contacts 176 and 178, lead to the remaining circuits previously discussed. A bridge contact 182 is affixed to the upper surface of, and is movable with, diaphragm 154.

A vacuum fitting 184, at the lower end of adjuster 158 provides a connection for a flexible hose 186 which may be connected to the intake manifold of a carburetted gasoline engine.

With adjuster 158 properly adjusted to apply a predetermined upward force through spring 162 to diaphragm 154, with the engine at idle, the high vacuum (low manifold pressure) applied through hose 186 to lower chamber 152 moves diaphragm 154 downward against the force applied by spring 162 so that bridge contact 182 is out of contact with contacts 176 and 178. When the accelerator pedal is depressed beyond a predetermined amount, the vacuum provided through hose 186 is reduced (the pressure increases) sufficiently that the urging of spring 162 overcomes the downward force of the vacuum and moves bridge contact 182 into contact with contacts 176 and 178. In this condition, a completed electric circuit is provided between wires 182 and, if the corresponding clutch switch (not shown) is also closed by actuation of the clutch pedal, an alarm is generated.

Although manifold pressure is slightly affected by engine speed as well as by the amount of accelerator depression, this affect is slight as compared to that produced by the accelerator. Thus, switch 148 is actuated substantially independently of engine speed and it depends instead on the amount by which the accelerator is depressed.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An alarm system for a motor vehicle of the type having a manually operated clutch and a manually operated accelerator comprising
   an alarm device operative when energized to produce an alarm;
   means for preventing said energizing at least during starting said motor vehicle into motion and being effective during small values of operation of said accelerator and ineffective at large values thereof;
   first and second normally open switches in series between an electrical power source and said alarm device;
   first means for closing said first switch whenever said clutch is actuated;
   second means for closing said second switch whenever said accelerator is actuated more than a predetermined amount; and
   said predetermined amount being greater than an amount employed during actuation of said clutch during startup and properly synchronized gear change.

2. An alarm system for a motor vehicle of the type having a manually operated clutch and a manually operated accelerator comprising
   an alarm device operative when energized to produce an alarm;
   an electrical power source;
   a first switch interposed between the electrical power source and the alarm device;
   a second switch interposed between the electrical power source and the alarm device;
   first means for actuating said first switch whenever said clutch is actuated; and
   second means for actuating said second switch whenever said accelerator is actuated more than a predetermined amount.

3. The alarm system according to claim 2 wherein the first switch and the second switch are normally open and in series between the electrical power source and said alarm device.

4. The alarm system according to claim 2 wherein said predetermined amount is greater than an amount employed during actuation of said clutch during startup and properly synchronized gear change.

5. An alarm system according to claim 2 including further means for preventing said energizing at least during starting said motor vehicle into motion.

6. An alarm system according to claim 5 wherein said further means includes switch means actuated by engagement of low gear in said vehicle for preventing said energizing.

7. An alarm system according to claim 5 wherein said means includes a delay for preventing said energizing during short periods of said simultaneous operation.

8. An alarm system according to claim 5 wherein said further means includes switch means actuated by a tachometer for preventing said energizing at engine speeds below a predetermined value.

9. An alarm system according to claim 5 wherein said further means is effective during small values of operation of said accelerator and is ineffective at large values thereof.

10. An alarm system according to claim 9 wherein said further means includes a switch actuated by a pressure in an engine of said motor vehicle, said pressure being variable with varying amounts of actuation of said accelerator.

11. An alarm system according to claim 1 wherein each of said first and second switches includes:
    a housing;
    a sliding block in said housing;
    means coupled to one of said clutch and accelerator for moving said sliding block from a first position to a second position in said housing;
    first and second electric terminals in said housing;
    first and second spaced-apart contact devices connected respectively to said first and second electrical terminals and bearing at first and second spaced-apart location on said sliding block;
    a bridge contact on said sliding block;
    said bridge contact being in contact with no more than one of said contact devices when said sliding block is in said first position; and
    said bridge contact being in contact with both of said contact devices when said sliding block is in said second position whereby electrical contact is made between said first and second electrical terminals.

12. An alarm system according to claim 11 wherein said further means being a substantial distance between said first and second positions.

* * * * *